3,679,613
PROCESS FOR THE PRODUCTION OF
POLYAMIDE FOAMS
Heinrich Gilch, Bonn-Ippendorf, and Hermann Schnell, Krefeld-Uerdingen, Germany, assignors to Farbenfabriken Bayer Aktiengesellschaft, Leverkusen, Germany
No Drawing. Continuation-in-part of application Ser. No. 611,803, Jan. 26, 1967. This application Mar. 17, 1970, Ser. No. 20,400
Claims priority, application Germany, Feb. 4, 1966, F 48,347; July 22, 1966, F 49,764
The portion of the term of the patent subsequent to May 7, 1985, has been disclaimed
Int. Cl. C08j 1/22
U.S. Cl. 260—2.5 N                                9 Claims

ABSTRACT OF THE DISCLOSURE

A process of preparing polyamide foams by heating a lactam or a mixture of lactams having at least 7 ring members with at least one mole percent of an organic isocyanate or masked isocyanate at a temperature above 130° C. in the presence of an alkali metal or alkaline earth metal compound wherein the mole ratio of isocyanate to metal compound is greater than 5:1.

---

This application is a continuation-in-part of our prior copending case Ser. No. 611,803 filed Jan. 26, 1967, now abandoned.

This invention relates to an economical process for the production of polyamide foams in which foaming is carried out during the polymerization of lactams.

It is known that polyamide foams can be produced by mixing polyamide melts with substances which volatilize in the polyamide melt or give off gaseous products. Unfortunately, processes such as these are difficult to work on an industrial scale and generally yield non-uniform foams of high density.

It is also known that polyamide foams can be produced by blowing in inert gases, for example nitrogen, during the rapidly proceeding, ionic polymerization reaction carried out in the presence of bases and co-catalysts, or by carrying out the polymerization reaction in the presence of products which give off gases, for example acids or readily volatile substances. The blowing-in of inert gases is a difficult technique to handle on an industrial scale, involving complicated apparatus. Complicated mouldings can only with great difficulty be obtained in this way. If polymerisation is carried out in the presence of materials which give off gases, such as azides, the evolution of gas must begin at exactly the same time as polymerisation. Any slight delays in the reaction or variations in the induction period result in varying densities, or prevent foaming altogether. In addition, the handling of azides involves hazards which should never be underestimated. In cases where foaming is carried out during the ionic polymerisation of lactams by the addition of relatively low-boiling materials such as volatile solvents, it is usually only possible to apply the "two-pot" process. As soon as polymerisation begins, a readily volatile substance or solution thereof is stirred into the lactam. Application of the "one-pot" process has the disadvantages referred to above, i.e. the tests are difficult to reproduce on an industrial scale. Any foaming which is based on the ionic polymerisation reaction, must be carried out in the strict absence of water, whilst the lactams themselves have to be dried with particular care before polymerisation, which involves complications and takes time when carried out on a large scale.

It has now been found that polyamide foams can be produced from ionically polymerised lactams by a process which comprises heating the lactam or a mixture of lactams having at least 7 ring members with at least 1 mol percent, based on lactam, of an organic isocyanate or masked isocyanate at temperatures above 130° C. in the presence of basic alkali metal or alkaline-earth metal compound the molar ratio of isocyanate to base being greater than 5:1.

The temperature at which the lactam can be foamed by the process according to the invention is between 130° C. and the boiling point of the corresponding lactam. In contrast to the conventional, ionic polymerisation process used to prepare bubble-free polyamide, where even traces of water are sufficient to inhibit polymerisation, it has been found that foaming can still be carried out even when the lactam has a water content of 0.3%. The density of the foams is governed both by the temperature and by the isocyanate content. In the process according to the invention, the lactams having at least seven ring members, such as caprolactam, caprylactam and lauric lactam, are used either individually or in admixture with one another. Industrial products may be used without further purification or drying.

Alkali-metal or alkaline-earth metal salts of highly pure carboxylic acids and polycarboxylic acids with more than one carbon atom, are used as the basic alkali metal or alkaline-earth metal compounds. Salts of relatively high molecular weight fatty acids, such as stearic acid, improve the mould-release properties of the foams. Potassium nitrite, sodium cyanamido, potassium carbonate, sodium phenoxide, potassium cyanamide and sodium cyanide, for example, are also suitable. Salts which are soluble in caprolactam, are particularly suitable. It is of advantage to use finely powdered salts which do not contain any water of crystallisation.

Suitable organic isocyanates are alkyl or aryl mono- or polyisocyanates, such as stearyl isocyanate, phenyl isocyanate, hexamethylene diisocyanate and phenylene diisocyanate. Isocyanate formers (masked isocyanates) which form isocyanates on heating for example, such as hexamethylene-1,6-bis-carbamidocaprolactam, have a similar effect. Polyisocyanates or masked polyisocyanates are particularly suitable. Polyisocyanates produce a particularly steep rise in the viscosity/time curve during foaming.

The reaction is carried out at temperatures between 130° C. and the boiling point of the corresponding lactam. The preferred temperature range is from 170 to 210° C.

Although the density of the foams is generally from 0.1 to 0.9 g./cm.$^3$, it can be reduced even further by foaming in vacuo or by the addition of products which give off or form gases. Homopolymers of caprolactam usually produce hard foams. Lactams of fairly high molecular weight such as lauric lactam, or copolymers of lactams for example, caprolactam and lauric lactam, yield softer and more elastic products. The relative solution viscosity of the polymers generally varies between 6 and 12, as measured in m-cresol (1 g. of polyamide in 100 ml. of m-cresol) at 25° C.

Fillers such as powdered asbestos, talcum, glass and asbestos fibres, as well as dyes and pigments may be added to the foams produced by the process according to the invention. Polyamide foams produced by this process can be used for electrical, thermal or acoustic insulation where mechanical stressing is also involved. For example, they can be used in the building industry to fill cavities, providing the foam is introduced before it solidifies. In this application, it is of advantage to produce the foam in an extruder. Where foaming is carried out in moulds, it is possible to produce foams moulded into specific shapes which also withstand high mechanical stresses. Mouldings of this kind can be used for example in the building industry or for the production of thermally insulated containers. They can be sawn and machined with cutting tools in general. Screws and nails can be anchored in these foams. Elastic foams are particularly suitable for the electrical insulation of wires.

The following examples illustrate more specifically the invention.

Although the examples show preferred and non-preferred applications of the invention, it is to be understood that when the ratio of NCO groups to mole of alkali metal compound is at least 5:1 and is preferably below 30:1, no blowing agent or stirring is required to produce the foams of this invention. Clearly so long as the ratio is used one can further incorporate blowing agents and/or stirring if desired. The ratio in question may be defined as $$\frac{(\text{moles NCO compound}) \times f}{(\text{moles alkali metal compound})}$$

where $f$ is functionality of isocyanate compound (i.e. the number of NCO groups per mole).

Example 1

A mixture of 100 g. of caprolactam, 4 ml. of hexamethylene diisocyanate and 0.5 g. of sodium acetate, is heated at 200° C. in a glass vessel. Polymerization begins after an interval of 210 seconds and is accompanied by foaming. The density of the foam is 0.36 g./cm.$^3$.

If 0.25 g. of sodium acetate is used the induction time is lengthened to 240 seconds, although the density of the resulting foam is about the same.

Example 2

A mixture of 100 g. of caprolactam, 4 ml. of hexamethylene diisocyanate and 0.5 g. of potassium benzoate, is heated with stirring at 200° C. Foaming begins after an interval of 190 seconds. The resulting foam has a density of 0.34 g./cm.$^3$. The induction times for batches containing 0.25 g. and 0.1 g., respectively, of potassium benzoate are 180 and 240 seconds.

Example 3

A mixture of 100 g. of caprolactam, 4 ml. of hexamethylene diisocyanate and 0.5 g. of the sodium salt of cinnamic acid, is heated with stirring at 200° C. Foaming begins after an interval of 7 minutes. Density=0.35 g./cm.$^3$.

Example 4

A mixture of 100 g. of caprolactam, 10 g. of hexamethylene 1,6-bis-carbamidocaprolactam and 0.5 g. of sodium stearate is heated at 200° C. Foaming begins after an interval of 7 minutes. Density=0.24 g./cm.$^3$.

Example 5

The procedure is as in Example 4, except that 5 ml. of dioxan are added when foaming begins. Density=0.18 g./cm.$^3$.

Example 6

A mixture of 100 g. of caprolactam, 1 g. of sodium stearate and 5 g. of diphenyl methane-4,4'-diisocyanate is heated with stirring at 200° C. Foaming begins after an interval of 2 minutes. Density=0.33 g./cm.$^3$.

If the diphenylmethane-4,4'-diisocyanate is used in quantities of 2 g. and 1 g. respectively, foams with densities of 0.41 g./cm.$^3$ and 0.62 g./cm.$^3$ are formed.

Example 7

A mixture of the kind described in Example 2 is heated with stirring at 200° C. When polymerization starts, the reaction vessel is evacuated to 10 mm. Hg. The foam has a density of 0.09 g./cm.$^3$. The foam is more uniform if 5 g. of powdered asbestos are added to the above mixture.

Example 8

A mixture of 20 g. of caprolactam, 0.8 g. of hexamethylene diisocyanate and 0.1 g. of potassium nitrite is heated with stirring at 180° C. Foaming begins after an interval of 4 minutes. Density of foam=0.39 g./cm.$^3$.

Example 9

A mixture of 20 g. of caprolactam, 0.1 g. of sodium cyanamide and 0.8 g. of hexamethylene diisocyanate, is heated with stirring at 180° C. Foaming begins after an interval of two minutes. The foam has a density of 0.44 g./cm.$^3$.

Example 10

A mixture of 20 g. of caprolactam, 0.1 g. of sodium phenoxide and 0.8 g. of hexamethylene diisocyanate is heated at 180° C. Foaming begins after 16 minutes. The foam has a density of 0.315 g./cm.$^3$.

Example 11

The procedure is as in Example 5. As soon as there is an increase in viscosity, the pressure is reduced to 10 mm. Hg. The foam which is formed has a density of 0.05 g./cm.$^3$.

Example 12

The procedure is as in Example 4 except that 5 g. of asbestos powder is added as filler. The resulting foam has a finer porosity and is more uniform.

Example 13

A mixture of 30 g. of lauric lactam, 0.2 g. of potassium carbonate and 1.6 g. of hexamethylene diisocyanate is heated at 200° C. The foam which is formed after an interval of 40 minutes has a density of 0.5 g./cm.$^3$.

What we claim is:

1. A process for the production of polyamide foams from lactams, which comprises heating a lactam or a mixture of lactams having from 7 to 13 ring members with at least 1 mole percent based on the lactams of an organic isocyanate or masked isocyanate at a temperature from about 130° C. to about the boiling point of the corresponding lactam or lactams in the presence of an alkali metal compound selected from the group consisting of salts of carboxylic acids with more than 1 carbon atom, salts of polycarboxylic acids with more than 1 carbon atom, potassium nitrite, potassium cyanamide, sodium cyanamide, potassium carbonate, sodium phenoxide, and sodium cyanide, the ratio of isocyanate functional groups to moles of alkali metal as defined by the formula $$\frac{(\text{moles NCO compound}) (f)}{(\text{moles alkali metal compound})}$$

where $f$=functionality of NCO compound being from about 8:1 to about 30:1, said foaming being conducted in the absence of a blowing agent or stirring.

2. The process as claimed in claim 1 wherein said organic isocyanate is hexamethylene diisocyanate.

3. The process as claimed in claim 1 wherein said organic isocyanate is 4,4'-diphenylmethane diisocyanate.

4. The process as claimed in claim 1 wherein said masked isocyanate is hexamethylene-1,6-bis-carbamidcaprolactam.

5. The process as claimed in claim 1, wherein said alkali-metal compound is sodium acetate.

6. The process as claimed in claim 1, wherein said alkali-metal compound is sodium stearate.

7. The process as claimed in claim 1 wherein said alkali-metal compound is potassium nitrite.

8. The process as claimed in claim 1 wherein said alkali-metal compound is potassium carbonate.

9. The process as claimed in claim 1, wherein said alkali-metal compound is sodium cyanoamide.

References Cited

UNITED STATES PATENTS

| 3,382,195 | 5/1968 | Gilch et al. | 260—2.5 N |
| 3,017,391 | 1/1962 | Mottus et al. | 260—2.5 N |
| 3,028,369 | 4/1962 | Great Britain | 260—78 L |

FOREIGN PATENTS

| 918,059 | 2/1963 | Great Britain | 260—2.5 N |
| 721,343 | 9/1965 | Canada | 260—2.5 N |

MURRAY TILLMAN, Primary Examiner

M. FOELAK, Assistant Examiner

U.S. Cl. X.R.

260—18 N, 78 L